US012490009B2

(12) United States Patent
Zhu et al.

(10) Patent No.: US 12,490,009 B2
(45) Date of Patent: Dec. 2, 2025

(54) WIRELESS EARPHONE AND A ROTARY EARHANGER STRUCTURE THEREOF

(71) Applicant: SHENZHEN CANNICE TECHNOLOGY CO., LTD., Shenzhen (CN)

(72) Inventors: Qilong Zhu, Shenzhen (CN); Ke Chen, Shenzhen (CN); En Xie, Shenzhen (CN); Yunfeng Zhang, Shenzhen (CN); Bin Gao, Shenzhen (CN)

(73) Assignee: SHENZHEN CANNICE TECHNOLOGY CO., LTD., Shenzhen (CN)

( * ) Notice: Subject to any disclaimer, the term of this patent is extended or adjusted under 35 U.S.C. 154(b) by 295 days.

(21) Appl. No.: 18/208,584

(22) Filed: Jun. 12, 2023

(65) Prior Publication Data

US 2024/0147125 A1 May 2, 2024

(30) Foreign Application Priority Data

Oct. 27, 2022 (CN) ......................... 202222846755.6

(51) Int. Cl.
*H04R 1/10* (2006.01)

(52) U.S. Cl.
CPC ......... *H04R 1/1041* (2013.01); *H04R 1/1016* (2013.01); *H04R 1/105* (2013.01)

(58) Field of Classification Search
CPC ..... H04R 1/1041; H04R 1/1016; H04R 1/105
USPC .......................................................... 381/309
See application file for complete search history.

(56) References Cited

U.S. PATENT DOCUMENTS 6,377,697 B1 * 4/2002 Cheng .................... H04R 1/083 381/381
2011/0129111 A1 * 6/2011 Santiago .............. H04R 5/0335 16/248

* cited by examiner

*Primary Examiner* — Vivian C Chin
*Assistant Examiner* — Douglas J Suthers
(74) *Attorney, Agent, or Firm* — Maschoff Brennan

(57) ABSTRACT

A rotary earhanger structure of a wireless earphone includes an earhanger unit and a movable connection sleeve rotationally connected therewith. One end of the earhanger unit includes a first inclined surface portion extending obliquely in a preset rotational direction. The movable connection sleeve has a second inclined surface portion cooperatively connected with the first inclined surface portion. The movable connection sleeve is connected with an elastic member for driving the movable connection sleeve in a direction close to the earhanger unit. The external force rotates the earhanger unit in the preset rotating direction to adjust the wearing angle. When the earhanger unit is not subjected to the external force, the movable connection sleeve moves in the direction close to the earhanger unit under the force of the elastic member, so that the automatic reset function after the earhanger rotation is realized, thereby simplifying user operation and improving user experience.

8 Claims, 10 Drawing Sheets

WIRELESS EARPHONE AND A ROTARY EARHANGER STRUCTURE THEREOF

CROSS-REFERENCE TO RELATED APPLICATIONS

This application claims priority to Chinese Patent Application No. 202222846755.6, filed on Oct. 27, 2022, entitled "Bluetooth Earphone And A Rotary Earhanger Structure Thereof", which is incorporated herein by reference in its entirety.

FIELD OF THE TECHNOLOGY

The present utility relates to the technical field of earphones, in particular to a wireless earphone and a rotary earhanger structure thereof.

BACKGROUND

Generally, the earphone comprises an earphone body, and an earhanger unit matched with the earphone body, the earphone body can be hung on the auricle of the wearer through the arrangement of the earhanger unit, and the relative position between the earphone body and the ear of the wearer is maintained.

The earphone structure in the prior art comprises an earhanger unit and an earphone connection part, a groove body is formed in one end of the earhanger unit, the earphone connection part can be rotatably mounted in the groove body, and the wearer can realize transverse rotation and longitudinal stretching function of the earhanger by adjusting the telescopic amount and the rotation amount of one end part of the earphone connection part; however, the defect of the structure is that when the user wears the earphone to adjust, the user needs to stretch the hand to the ear to stretch or rotate the earhanger unit, which brings inconvenience to the operation of the user and reduces the use experience.

In view of this, it is necessary to improve the structure of the earphone in the prior art to solve the technical problems that the earphone is inconvenient to operate when being worn.

SUMMARY

An object of this utility is to provide a wireless earphone and a rotary earhanger structure thereof, which solve the above technical problems.

To achieve this goal, this utility adopts the following technical solutions:

A rotary earhanger structure, comprising an earhanger unit and a movable connection sleeve rotatably connected to the earhanger unit;

one end of the earhanger unit is provided with a first inclined surface portion extending obliquely in a preset rotational direction, and the movable connection sleeve is provided with a second inclined surface portion cooperatively connected with the first inclined surface portion;

the movable connection sleeve is connected with an elastic member for driving the movable connection sleeve to move in a direction close to the earhanger unit.

Optionally, one end of the earhanger unit is provided with a connection shaft portion and an earhanger coupling portion, the connection shaft portion is rotatably sleeved in the movable connection sleeve and slidable relative to the movable connection sleeve;

the earhanger coupling portion is arranged around the connection shaft part; and the movable connection sleeve abuts against the earhanger coupling portion.

Optionally, the first inclined surface portion is a notch groove provided at a preset position on the earhanger coupling portion, and the second inclined surface portion is an inclined surface body protruding from the movable connection sleeve;

when the earhanger coupling portion rotates to a preset angle relative to the movable connection sleeve, the inclined surface body is engaged in the notch groove.

Optionally, the notch groove comprises a first groove surface arranged along the length direction of the connection shaft portion and a second groove surface extending obliquely along the preset rotation direction;

wherein, the shape of the inclined surface body matches the shape of the notch groove.

Optionally, further comprising a sleeve, and the movable connection sleeve is slidably sleeved in the sleeve;

the sleeve is provided with a first limiting boss, the movable connection sleeve slides along the sleeve to a preset position, and the movable connection sleeve abuts against the first limiting boss.

Optionally, the sleeve is provided with a second limiting boss at one end away from the earhanger unit;

wherein, the elastic member is a spring, and both ends of the spring are respectively connected to the movable connection sleeve and the second limiting boss.

Optionally, one end of the sleeve away from the earhanger unit is provided with a protective sleeve, and one end face of the protective sleeve is provided with an accommodating groove;

a through hole is formed in the middle of the second limiting boss, and one end part of the connection shaft part penetrates through the through hole and is accommodated in the accommodating groove.

Optionally, the insertion end of the connection shaft portion is provided with an annular groove, and an isolation sleeve is mounted in the annular groove;

the isolation sleeve is accommodated in the accommodating groove, and the diameter of the isolation sleeve is larger than the diameter of the through hole.

Optionally, the sleeve comprises a first cylinder and a second cylinder provided with splicing arrangements, and a cavity is formed between the first cylinder and the second cylinder; a plurality of perspective windows communicated with the cavity are formed in the outer side wall of the sleeve;

a hollow separation film is sleeved outside the sleeve, and the hollow separation film is covered outside the perspective windows.

This utility further provides a wireless earphone, which comprises the rotary earhanger structure as described above.

Compared with the prior art, this utility has the following beneficial effects: in the initial state, the movable connection sleeve is in the position close to the earhanger unit under the force of the elastic member; when in use, the external force drives the earhanger unit to rotate in the preset rotating direction to adjust the wearing angle of the earhanger unit; due to the matching effect of the first inclined surface portion and the second inclined surface portion, the movable connection sleeve is pushed to move in the direction away from the earhanger unit; when the earhanger unit is not subjected to the external force, the movable connection sleeve moves in the direction close to the earhanger unit under the force of the elastic member, so that the earhanger unit returns to the initial state or is close to the initial state, and the automatic reset function after the earhanger rotation is realized; in actual operation, only the earhanger unit needs to be opened and then loosened, the earhanger unit resets and clamped by the ear of the user in order to simplify user operation and improve user experience.

BRIEF DESCRIPTION OF THE DRAWINGS

In order to more clearly illustrate the technical solutions in the embodiments of this utility or the prior art, the drawings needed in the embodiments or the prior art will be briefly introduced below, and obviously, the drawings in the following description are only some embodiments of this utility, and those skilled in the art can obtain other drawings according to these drawings without creative labor.

The structures, ratios, sizes, etc. shown in the drawings of this specification are only used to cooperate with the contents disclosed in the specification, so that those skilled in the art can understand and read the utility, and are not intended to limit this utility, so that this utility is not limited to the technical substantive meaning, the modification of any structure, the change in the proportional relationship, or the adjustment of the size, and should still fall within the coverage of the technical content disclosed by this utility without affecting the effect and the effect that can be achieved by this utility.

Figure 1:
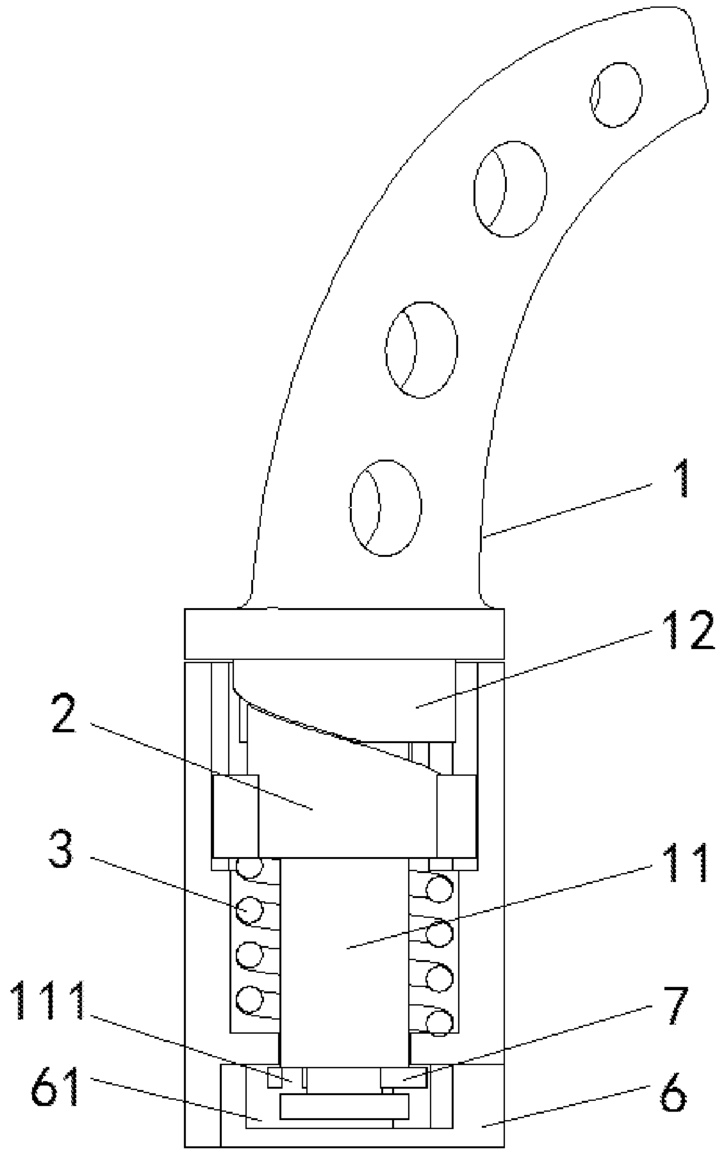
FIG. 1 is a first schematic cross-sectional view of the connection structure of the rotary earhanger structure.

Illustratively, the earhanger unit 1, the movable connection sleeve 2, the connection shaft portion 11, the elastic member 3, the earphone body 4, the earhanger coupling portion 12, the first inclined surface portion 121, the second inclined surface portion 21, the sleeve 5, the first limiting boss 51, the second limiting boss 52, the protective sleeve 6, the accommodating groove 61, the annular groove 111, the isolation sleeve 7, the perspective windows 53, the hollow separation film 8, and the silicon rubber sleeve 13.

DETAILED DESCRIPTION

In order to make the practical novel objects, features and advantages of this utility more obvious and understandable, the technical solutions in this utility will be clearly and completely described with reference to the accompanying drawings in the embodiments of this utility, and obviously, the embodiments described below are only a part of the embodiments of this utility rather than all of the embodiments. Based on the embodiments of this utility, all other embodiments obtained by those of ordinary skill in the art without creative efforts shall fall within the scope of this utility.

In the description of this utility, it should be understood that the orientation or positional relationship indicated by the terms "upper", "lower", "top", "bottom", "inner", "outer" and the like is based on the orientation or positional relationship shown in the drawings, and is merely for the convenience of describing this utility and simplifying the description, rather than indicating or implying that the device or element referred to must have a specific orientation and be constructed and operated in a specific orientation, and therefore cannot be understood as a limitation to this utility. It should be noted that when one component is considered to be "connected" to another component, it may be directly connected to another component or there may be a centrally disposed component at the same time.

The technical solution of this utility is further described below with reference to the accompanying drawings and by specific embodiments.

As shown in FIG. 1 to FIG. 10, this utility provides a rotary earhanger structure that comprises an earhanger unit 1 and a movable connection sleeve 2 rotatably connected to the earhanger unit 1;

- one end of the earhanger unit 1 is provided with a first inclined surface portion 121 extending obliquely in a preset rotational direction, and the movable connection sleeve 2 is provided with a second inclined surface portion 21 cooperatively connected with the first inclined surface portion 121;
- the movable connection sleeve 2 is connected with an elastic member 3 for driving the movable connection sleeve 2 to move in a direction close to the earhanger unit 1.

It is easy to understand that, when two components that are in an inclined surface cooperate with each other to rotate relative to each other, due to the relative sliding action of the inclined surface, a component can move in a direction close to or away from the other component;

it should be noted that, in the process of rotating the earhanger unit 1, the first inclined surface portion 121 slides relative to the second inclined surface portion 21 to push the movable connection sleeve 2 to move away from the earhanger unit 1, the elastic member 3 generates a reverse force to the movable connection sleeve 2 and causes the movable connection sleeve 2 to produce a clamping force acting on the earhanger unit 1 in order to keep the earhanger unit 1 in a clamping state and can avoid falling off from the user's ear.

The working principle of this utility is: the earhanger unit 1 is worn on the auricle of the user, the movable connection sleeve 2 is mounted on the earphone body 4, and the earphone body 4 is worn on the ear of the user through the connection shaft part 11 and the movable connection sleeve 2;

- in an initial state, the movable connection sleeve 2 is in a position close to the earhanger unit 1 under the force of the elastic member 3; when in use, the external force drives the earhanger unit 1 to rotate along the preset rotary direction to adjust the wearing angle of the earhanger unit 1, due to the cooperation of the first inclined surface portion 121 and the second inclined surface portion 21, the movable connection sleeve 2 is pushed to move in the direction away from the earhanger unit 1; when the earhanger unit 1 is not subjected to the external force, the movable connection sleeve 2 moves in the direction close to the earhanger unit 1 under the force of the elastic member 3, so that the earhanger unit 1 returns to the initial state or is close to the initial state, and the automatic reset function after the earhanger rotation is realized, in actual operation, only the earhanger unit 1 needs to be opened and then released, the earhanger unit 1 resets and clamped by the ear of the user in order to simplify user operation and improve user experience. In this embodiment, one end of the earhanger unit 1 is provided with the connection shaft portion 11 and the earhanger coupling portion 12, the connection shaft portion 11 is rotatably sleeved in the movable connection sleeve 2 and can slide relative to the movable connection sleeve 2;

the earhanger coupling portion 12 is disposed around the connection shaft portion 11; the movable connection sleeve 2 abuts against the earhanger coupling portion 12; under the force of the elastic member 3, the movable connection sleeve 2 abuts against the earhanger coupling portion 12.

Further, the first inclined surface portion 121 is a notch groove 121 formed in a preset position on the earhanger coupling portion 12, and the second inclined surface portion 21 is the inclined surface body 21 protruding from the movable connection sleeve 2;

when the earhanger coupling portion 12 rotates to the preset angle relative to the movable connection sleeve 2, the inclined body 21 is clamped in the notch groove 121.

As shown in FIG. 1 to FIG. 5, when the earhanger unit 1 drives the earhanger coupling portion 12 to rotate relative to the movable connection sleeve 2, the inclined surface body 21 of the earhanger coupling portion 12 is inclined with the groove wall surface of the notch groove 121; in the rotating process, due to the change of the engagement part between the inclined surface body 21 and the earhanger coupling portion 12, the earhanger coupling portion 12 pushes the movable connection sleeve 2 to move up and down to compress the elastic member 3, and the elastic member 3 provides the reverse force to clamp the earhanger coupling portion 12;

when the earhanger coupling portion 12 rotates to the preset angle relative to the movable connection sleeve 2, the inclined body 21 is clamped in the notch groove 121, in this state, the earhanger unit 1 is in a clamping state, that is, the earhanger unit 1 cannot continue to rotate without external force at this time;

this state can be set to the optimum wear angle of the earhanger structure, that is, when the user is in use, the earhanger unit 1 is rotated to this state, and the inclined surface body 21 is clamped in the notch groove 121 to provide a significant clamping sensation to prompt the user to rotate in place.

In addition, the first inclined surface portion 121 may be provided as an inclined surface body protruding from the earhanger coupling portion 12, and the first inclined surface portion 12 is a notch groove, that is, satisfies that are in an inclined surface cooperate with each other.

Further, the notch groove 121 is the inclined surface groove, and the notch groove 121 includes a first groove surface arranged along the length direction of the connection shaft portion 11 and a second groove surface extending obliquely along the preset rotation direction; wherein, the shape of the inclined surface body 21 matches the shape of the notch groove 121. Through the arrangement of the first groove surface and the second groove surface, the rotation direction of the earhanger unit 1 is defined, that is, when rotating in the direction of the second groove surface, the inclined surface body 21 can rotate out of the notch groove 121 to facilitate unlocking of the earhanger unit 1; when rotating away in the rotation direction of the second groove surface, the inclined surface body 21 will abut against the first groove surface and cannot continue to rotate.

In this embodiment, the rotary earhanger structure further comprises a sleeve 5, and the movable connection sleeve 2 is slidably sleeved in the sleeve 5;

a first limiting boss 51 is arranged in the sleeve 5, the movable connection sleeve 2 slides along the sleeve 5 to a preset position, and the movable connection sleeve 2 abuts against the first limiting boss 51.

Figure 2:
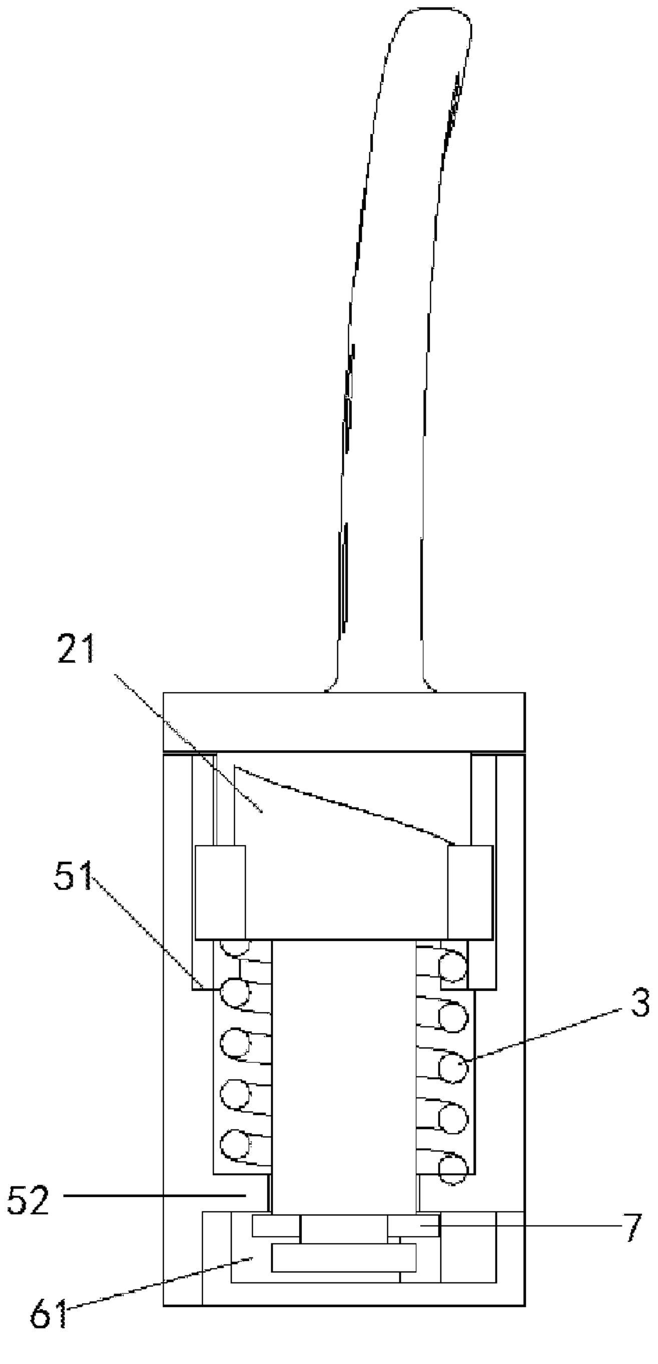
FIG. 2 is a second schematic cross-sectional view of the connection structure of the rotary earhanger structure.
Figure 3:
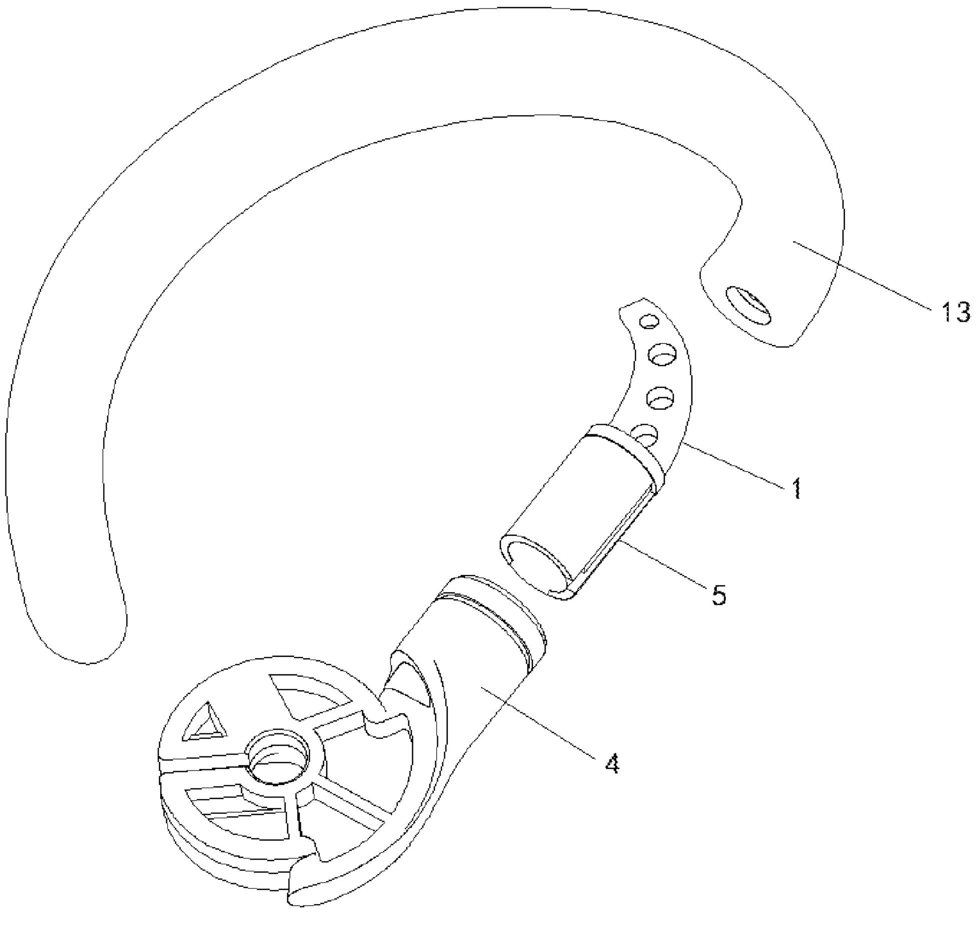
FIG. 3 is a first schematic exploded view of a part of the rotary earhanger structure and the earphone body.
Figure 4:
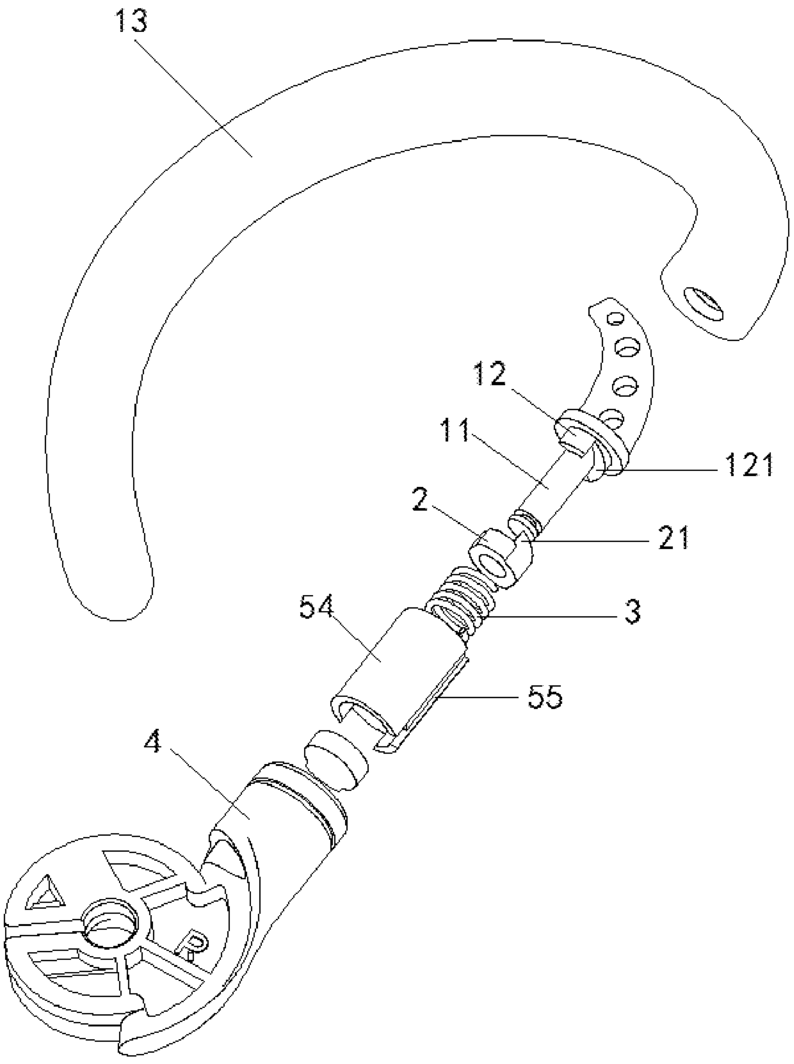
FIG. 4 is a second schematic exploded view of a part of the rotary earhanger structure and the earphone body.
Figure 5:
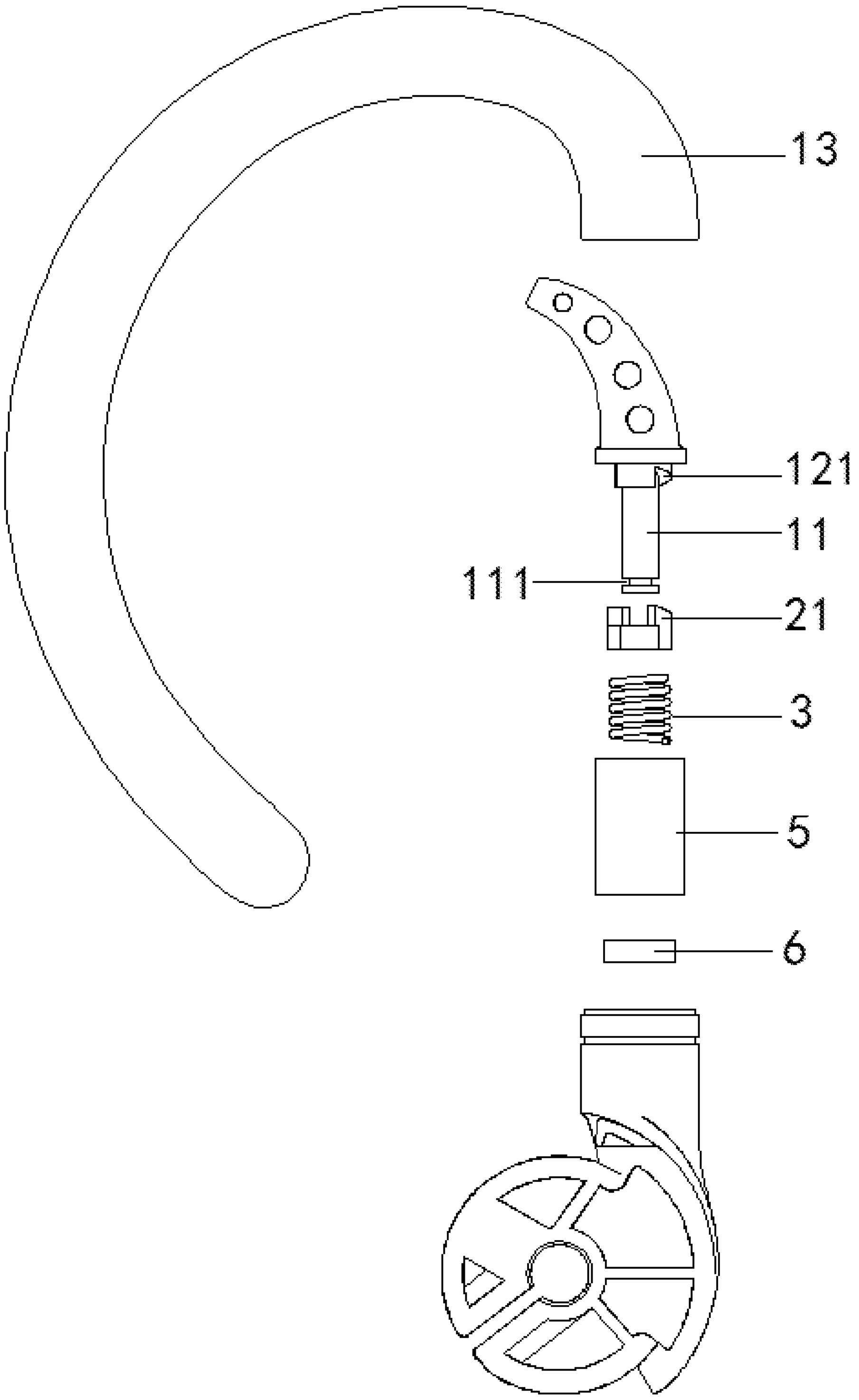
FIG. 5 is a third schematic exploded view of a part of the rotary earhanger structure and the earphone body.
Figure 6:
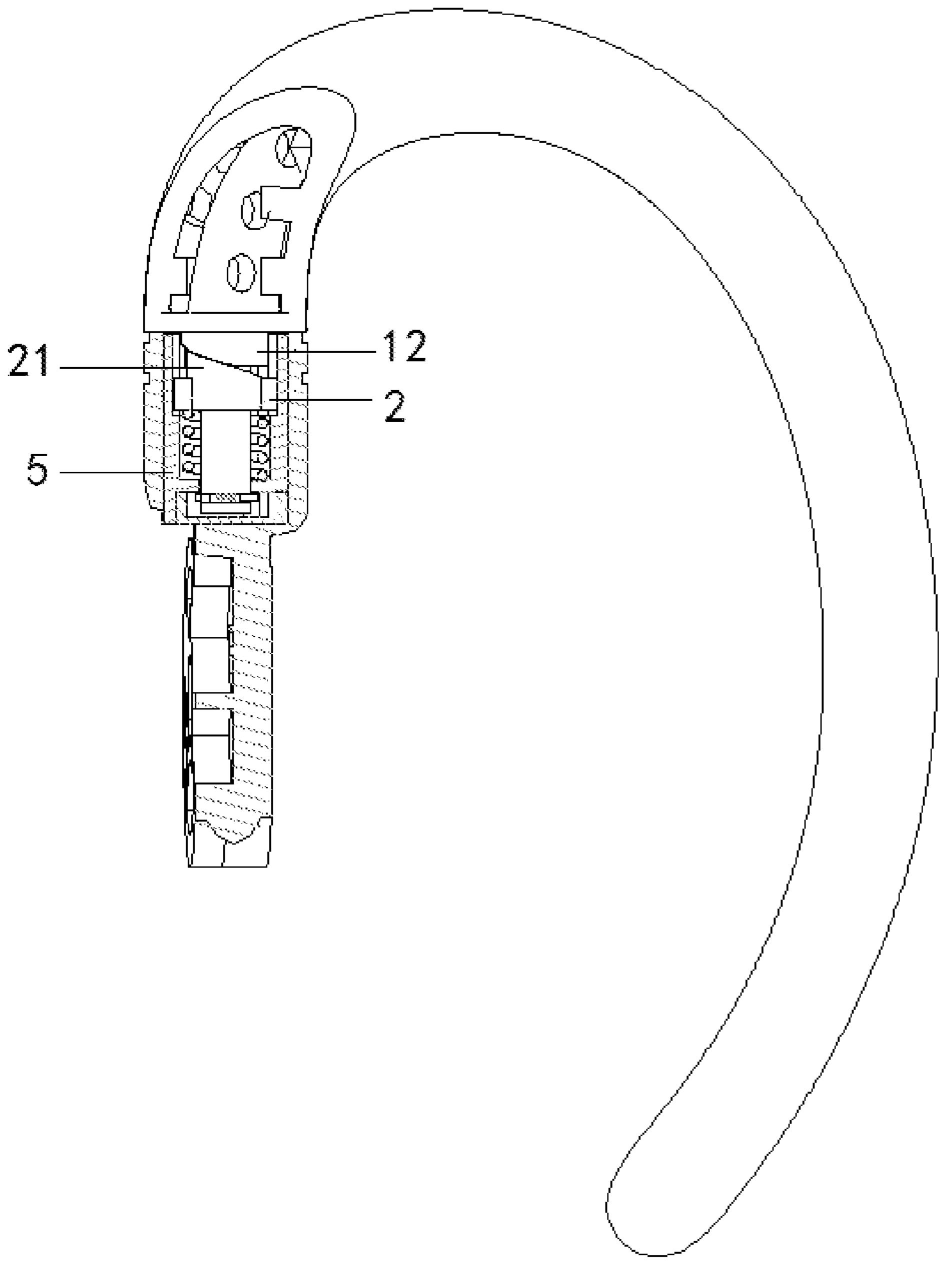
FIG. 6 is a first schematic cross-sectional view of the rotary earhanger structure.
Figure 7:
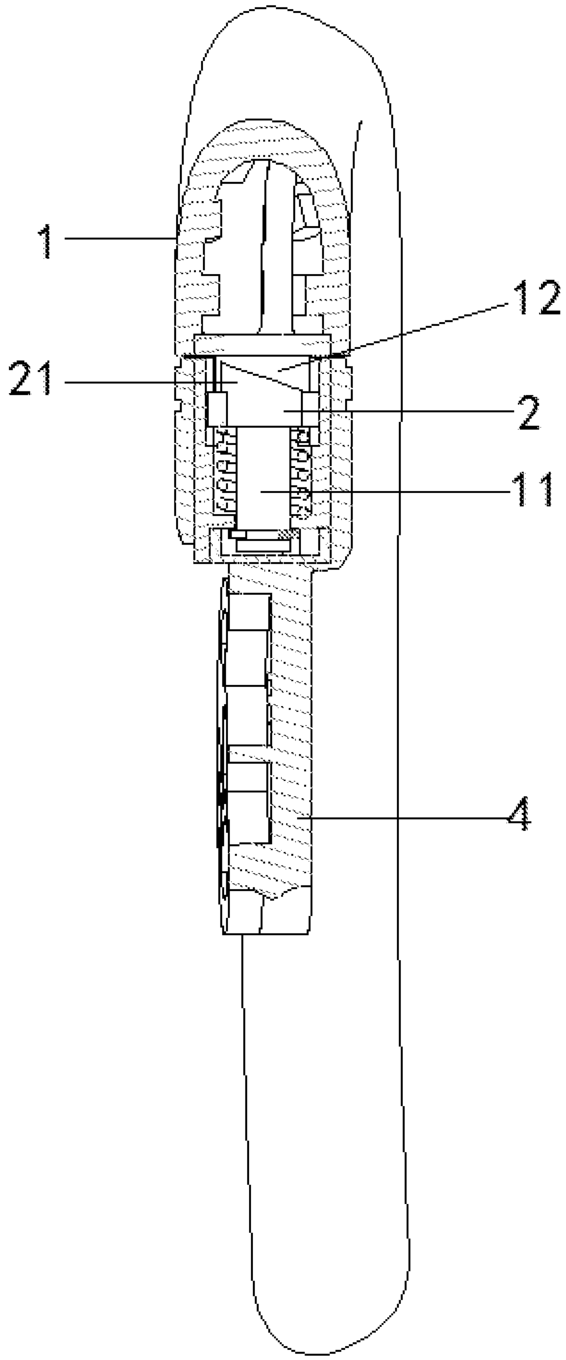
FIG. 7 is a second schematic cross-sectional view of the rotary earhanger structure.
Figure 8:
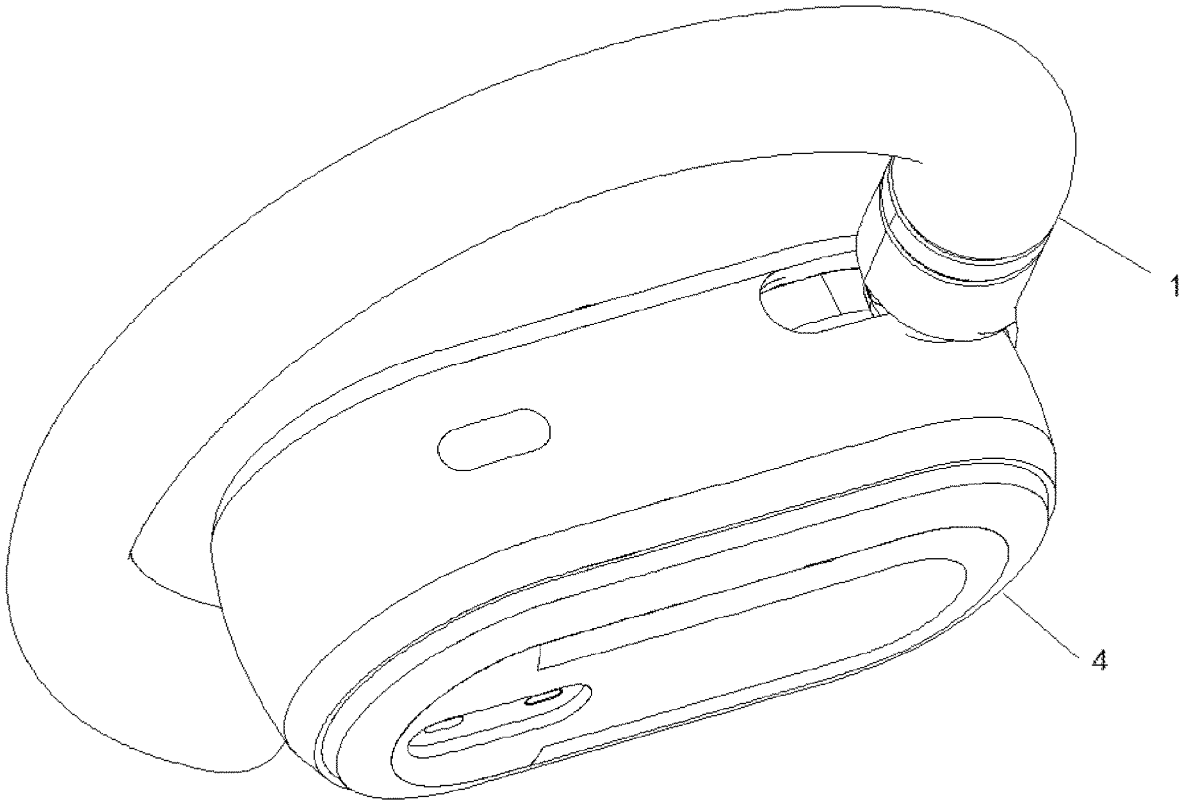
FIG. 8 is a structural schematic diagram of a first rotation state of the earhanger units of the rotary earhanger structure.
Figure 9:
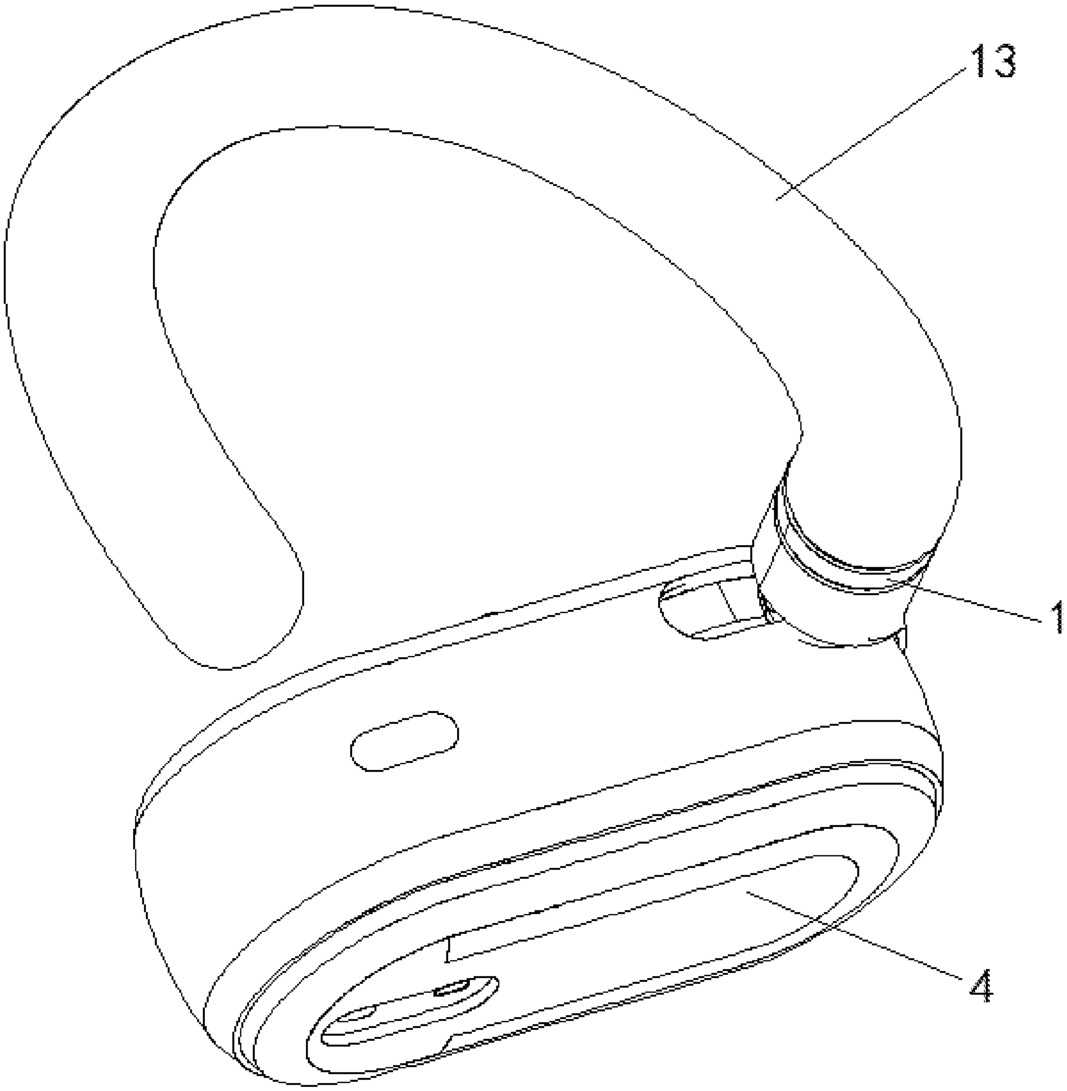
FIG. 9 is a schematic structural diagram of a second rotation state of an earhanger unit of the rotary earhanger structure.
Figure 10:
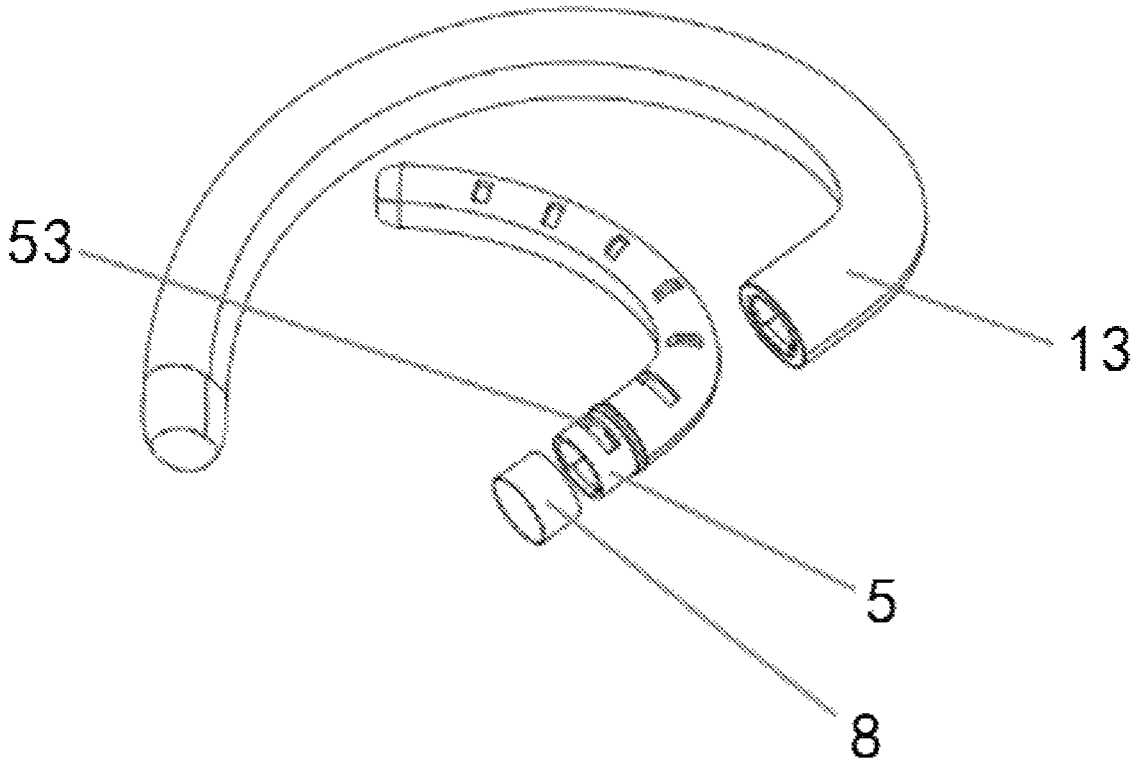
FIG. 10 is a schematic structural diagram of a hollow separation film and a sleeve of the rotary earhanger structure.

As shown in FIG. 2, a first limiting space is formed between the first limiting boss 51 and the upper end opening of the sleeve 5, so that the movable connection sleeve 2 slides up and down along the first limiting space;

further, the second limiting boss 52 is disposed at an end of the sleeve 5 away from the earhanger unit 1;

wherein, the elastic member 3 is a spring, two ends of the spring are respectively connected to the movable connection sleeve 2 and the second limiting boss 52.

As shown in FIG. 2, a second limiting space is formed between the second limiting boss 52 and the movable connection sleeve 2, the spring is mounted in the second limiting space, and the spring is in a compressed state to provide an upward pushing force;

in addition, another arrangement of the elastic member 3 is that two ends of the elastic member 3 are respectively connected with the upper end of the movable connection sleeve 2 and the earhanger unit 1, the elastic member 3 is a tension spring, that is, an elastic restoring force is provided, and the movable connection sleeve 2 is driven to move in a direction close to the earhanger unit 1.

Further, one end of the sleeve 5 away from the earhanger unit 1 is provided with a protective sleeve 6, and one end surface of the protective sleeve 6 is provided with an accommodating groove 61;

a through hole is formed in the middle part of the second limiting boss 52, and one end part of the connection shaft part 11 penetrates through the through hole and is accommodated in the accommodating groove 61.

The role of the protective sleeve 6 is that, when the earphone is assembled, the sleeve 5 needs to be glued and fixed on the earphone body 4, in order to avoid colloid overflowing into the sleeve 5, the protective sleeve 6 is arranged at the end of sleeve 5 near the headphone body 4, the protective sleeve 6 accommodates the connection shaft part 11 in the accommodating groove 61, so that the inner space of the sleeve 5 is separated from the rubber-stripping mounting surface to protect the movable connection sleeve 2 and the elastic member 3.

Preferably, an annular groove 111 is formed in the insertion end of the connection shaft portion 11, and an isolation sleeve 7 is mounted in the annular groove 111; the isolation sleeve 7 is accommodated in the accommodating groove 61, and the diameter of the isolation sleeve 7 is larger than the diameter of the through hole.

In order to avoid long-term use, the insertion end of the connection shaft portion 11 is separated from the sleeve 5, and a circle of isolation sleeve 7 is additionally arranged at the periphery of the connection shaft portion 11, so that the strength of the connection shaft portion 11 is increased, and the connection shaft portion 11 is prevented from falling off.

Wherein, the isolation sleeve 7 is the preferred option, when the strength of the connection shaft portion 11 is sufficient, it may not be mounted.

Further, the sleeve 5 includes a first cylinder 54 and a second cylinder 55 provided with splicing arrangements, and a cavity is formed between the first cylinder 54 and the second cylinder 55;

in this solution, there are a plurality of forming manners of the sleeve 5, and the first cylinder 54 and the second cylinder 55 may provided with splicing arrangements, it may also provided with integrated form and then open a corresponding limiting boss inside the sleeve 5;

a plurality of perspective windows 53 communicated with the cavity are formed in the outer side wall of the sleeve 5; and the movable state of the movable connection sleeve 2 can be observed through the perspective windows 53.

Further, the sleeve 5 is sleeved with a hollow separation film 8, wherein the hollow separation film 8 is made of a light transmissive material; and the hollow separation film 8 is covered outside the perspective windows 53.

After assembly of the earhanger unit 1 and the sleeve 5 is completed, the molded silicone rubber sleeve 13 needs to be assembled again, in order to avoid overflowing into each connecting seam of the earhanger unit 1 and the perspective windows 53 when the silica gel is formed, the hollow separation film 8 is sleeved outside the sleeve 5 and the joint of the sleeve 5 and the earhanger unit 1, on the one hand can guarantee the function of the perspective windows 53, on the other hand can avoid the silicone into the joint and perspective windows 53, to improve the product quality.

The above embodiments are only used to describe the technical solutions of this utility, and are not limited thereto; although this utility has been described in detail with reference to the foregoing embodiments, those skilled in the art should understand that the technical solutions described in the foregoing embodiments may still be modified, or some of the technical features may be equivalently replaced, and these modifications or replacements do not make the essence of the corresponding technical solutions depart from the idea and scope of the technical solutions of the embodiments of this utility.

What is claimed is:

1. A rotary earhanger structure, comprising:

an earhanger unit;

an earhanger sleeve; and a movable connection sleeve rotatably connected to the earhanger unit and slidably sleeved in the earhanger sleeve;

wherein:

one end of the earhanger unit is provided with a first inclined surface portion extending obliquely in a preset rotational direction;

the movable connection sleeve is provided with a second inclined surface portion cooperatively connected with the first inclined surface portion;

the movable connection sleeve is connected with an elastic member for driving the movable connection sleeve to move in a direction close to the earhanger unit;

one end of the earhanger unit is provided with a connection shaft portion and an earhanger coupling portion, the connection shaft portion is rotatably sleeved in the movable connection sleeve and slidable relative to the movable connection sleeve;

the earhanger coupling portion is arranged around the connection shaft part;

the movable connection sleeve abuts against the earhanger coupling portion; and the earhanger sleeve is provided with a first limiting boss, the movable connection sleeve slides along the earhanger sleeve to a preset position, and the movable connection sleeve abuts against the first limiting boss.

2. The rotary earhanger structure according to claim 1, wherein:

the first inclined surface portion is a notch groove provided at a preset position on the earhanger coupling portion, and the second inclined surface portion is an inclined surface body protruding from the movable connection sleeve; and when the earhanger coupling portion rotates to a preset angle relative to the movable connection sleeve, the inclined surface body is engaged in the notch groove.

3. The rotary earhanger structure according to claim 2, wherein:

the notch groove comprises a first groove surface arranged along the length direction of the connection shaft portion and a second groove surface extending obliquely along the preset rotation direction; and the shape of the inclined surface body matches the shape of the notch groove.

4. The rotary earhanger structure according to claim 1, wherein:

the earhanger sleeve is provided with a second limiting boss at one end away from the earhanger unit; and the elastic member is a spring, and both ends of the spring are respectively connected to the movable connection sleeve and the second limiting boss.

5. The rotary earhanger structure according to claim 4, wherein:

one end of the earhanger sleeve away from the earhanger unit is provided with a protective sleeve, and one end face of the protective sleeve is provided with an accommodating groove;

a through hole is formed in the middle of the second limiting boss; and one end part of the connection shaft part penetrates through the through hole and is accommodated in the accommodating groove.

6. The rotary earhanger structure according to claim 5, wherein:

the insertion end of the connection shaft portion is provided with an annular groove, and an isolation sleeve is mounted in the annular groove;

the isolation sleeve is accommodated in the accommodating groove; and the diameter of the isolation sleeve is larger than the diameter of the through hole.

7. The rotary earhanger structure according to claim 1, wherein:

the earhanger sleeve comprises a first cylinder;

a second cylinder provided with splicing arrangements;

a cavity is formed between the first cylinder and the second cylinder;

a plurality of perspective windows communicated with the cavity are formed in the outer side wall of the sleeve; and a hollow separation film is sleeved outside the sleeve, and the hollow separation film is covered outside the perspective windows.

8. A wireless earphone, comprising the rotary earhanger structure according to claim 1.

* * * * *